Dec. 14, 1948.  M. MUSKAT ET AL  2,456,012
METHOD OF AND APPARATUS FOR MEASURING THE ELECTRICAL
PROPERTIES AND SURFACE CHARACTERISTICS OF MATERIALS
Filed Dec. 21, 1944  3 Sheets-Sheet 1
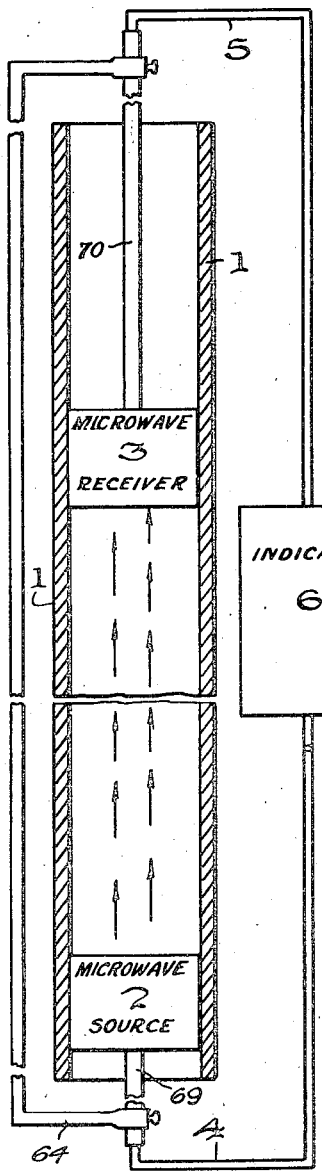
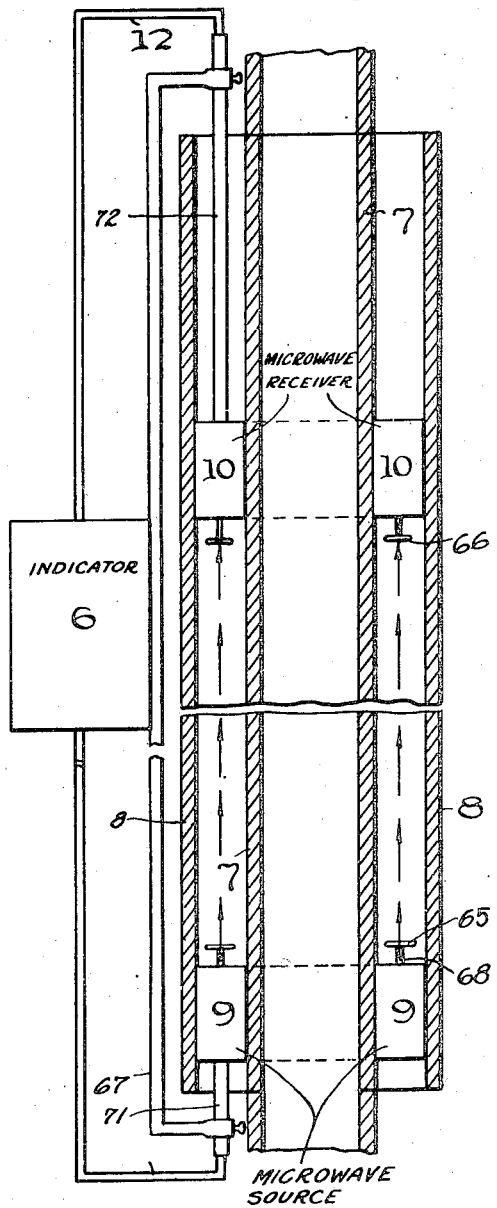
Inventors
MORRIS MUSKAT
NORMAN D. COGGESHALL
By G. M. Houghton
their Attorney

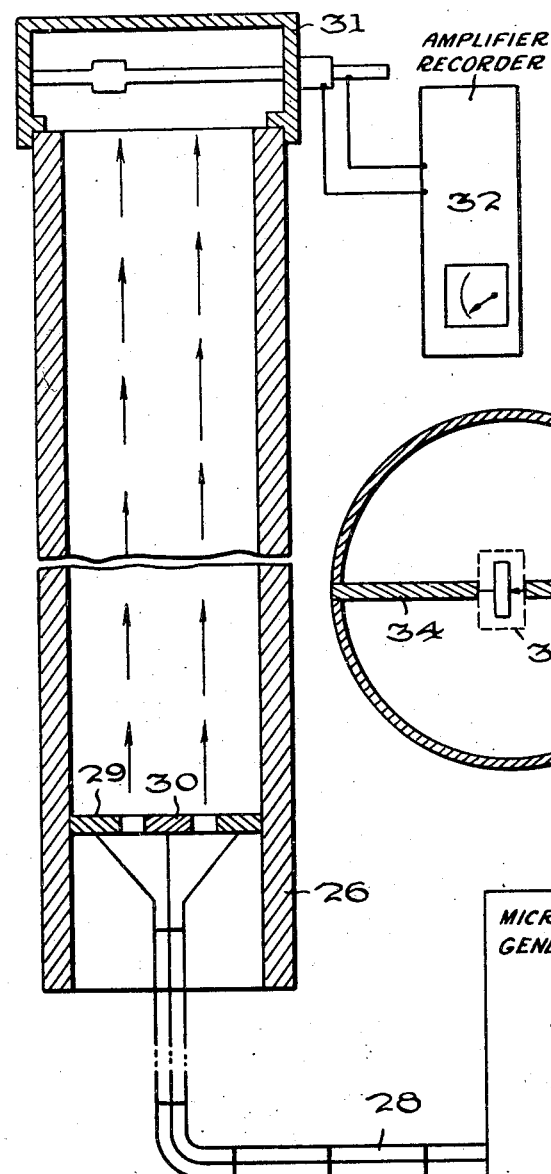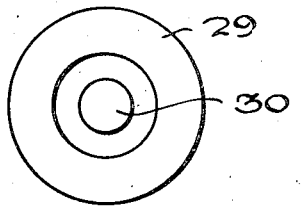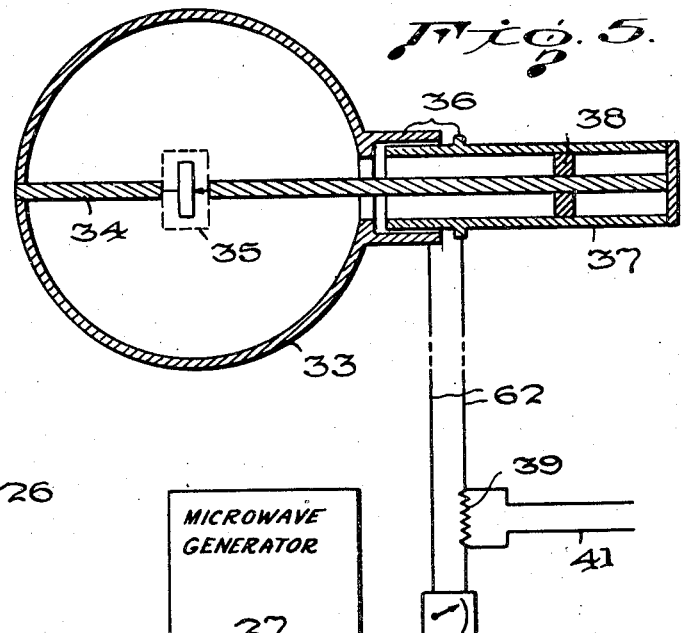

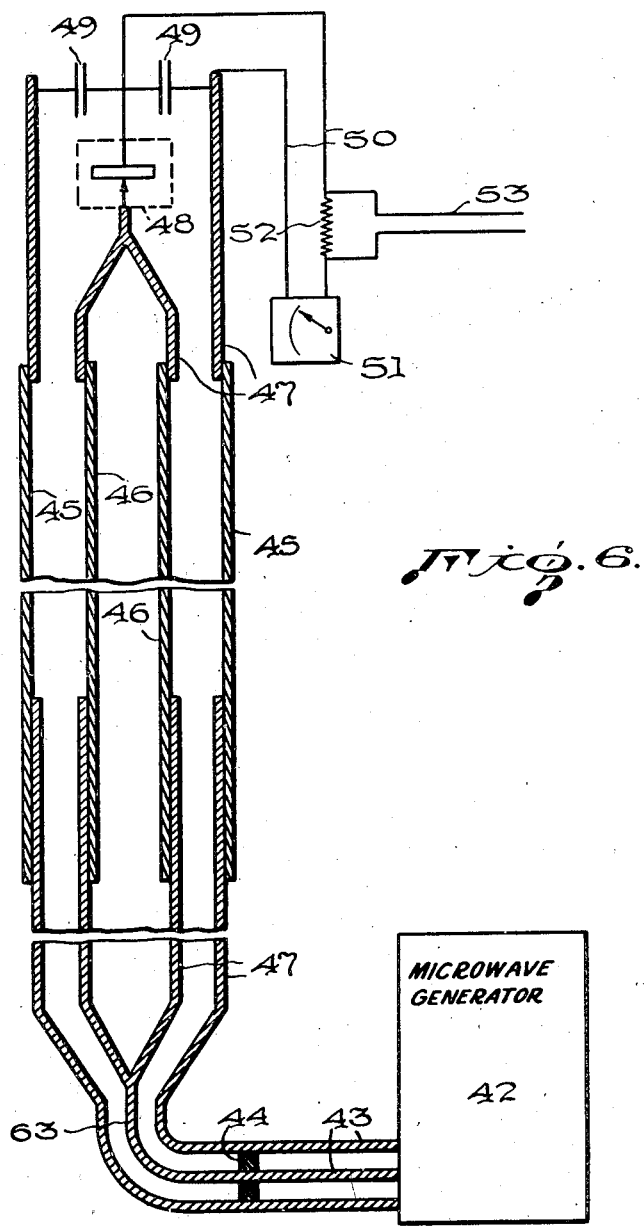

Patented Dec. 14, 1948

2,456,012

UNITED STATES PATENT OFFICE 2,456,012

METHOD OF AND APPARATUS FOR MEASURING THE ELECTRICAL PROPERTIES AND SURFACE CHARACTERISTICS OF MATERIALS

Morris Muskat, Oakmont, and Norman D. Coggeshall, O'Hara Township, Allegheny County, Pa., assignors to Gulf Research & Development Company, Pittsburgh, Pa., a corporation of Delaware Application December 21, 1944, Serial No. 569,224

2 Claims. (Cl. 175—183)

This invention concerns a new method of testing materials, in particular it concerns a method of testing tubular materials for surface cracks either on the inside or outside surface by means of very high frequency electromagnetic waves commonly called microwaves.

In the testing and inspecting of materials various methods have been devised for locating flaws. In the inspection of pipe it is comparatively simple to locate large leaks. Smaller flaws or cracks which go deep or all the way through the material wall may be found by various magnetic inspection or testing methods also well known in the art. However, it is known that even in an otherwise apparently perfect piece of metal, failure may eventually occur due to the presence of minute surface cracks which escape ordinary detecting methods. These cracks cause stress concentrations which tend to gradually enlarge the crack and failure ultimately takes place. Cracks may also occur in the case hardening or the carburized surface of treated materials. Minute surface cracks are also thought to be associated with the cause of "fatigue" failures, that is, "fatigue" is the gradual weakening of the material through growth of minute surface cracks. Heretofore no testing or inspection method has been able to locate these cracks.

A purpose of this invention is to provide a method for the inspection and testing of tubular materials for locating surface cracks which may be the incipient cause of future failure.

Another object is to provide a method of locating surface cracks on either the inside or outside surface of metal tubes or the outside surface of metal rods.

Another object is to provide a method for determining the surface characteristics of metal tubes or rods to locate any variation in surface material caused by irregular surface treatment.

A still further object is to provide a method of testing tubular insulating material to determine its surface characteristics.

The invention makes use of electromagnetic waves having wave lengths shorter than those used in normal long wave length radio broadcasting and on down through the microwave region, namely wave lengths of from a few meters to a fraction of a mm. The art of ultra high frequency communication and power transmission has shown that ultra high frequency electromagnetic waves can be efficiently transmitted in metallic conduits. Such conduits are called wave guides. The attenuation in these metallic wave guides is low and the wave system penetrates only slightly into the surface of the confining walls. This is the basic fact underlying the use of coaxial cables for the transmission of ultra high frequency electromagnetic waves.

Whereas the efficiency of wave guide transmission depends on the highly conducting character of the confining walls, it is true, conversely, that variations from the condition of high electrical conductivity will lead to loss in transmission efficiency and greater attenuation. Poorly conducting or insulating media are relatively transparent to ultra high frequency waves, and when the latter come in contact with them they will leak through them and leave the wave system. The change in metallic high conductivity may be due either to the interposition of dielectric material or faults or cracks in the metal surface such as may increase its effective electrical resistivity. In fact, the magnitude of the rate of attenuation and change in character of an ultra high frequency wave system, as it passes down a tubular body, is quantitatively related to the electrical properties of the wave guide material.

The tubular material may have any value of electrical characteristic, ranging from those for very good conductors to those for very poor conductors. If the tubular material is a good conductor, the attenuation of the received signal will be low, and an abnormally high attenuation will indicate the presence of faults or cracks in the surface or the presence of high resistance coatings. If the tubular material is a poor conductor, the attenuation will be high, and an abnormally low attenuation will indicate the presence of conducting defects such as the condensation of moisture on the surface or moisture entrained in surface pores or even surface decomposition.

In the event that coatings have been deliberately put on the surface of the tubular material, the method of this invention will serve to determine its thickness, as well as flaws or cracks therein. In the case of conducting surfaces on conductors such as obtained by metal plating or surface chemical processes, it becomes possible to detect cracks or thin spots. It is similarly possible to detect cracks or thin spots in insulating coatings put on the surface of metal pipe, etc. Furthermore, in the case of metallic surface coatings on insulating materials it becomes possible to detect breaks or thin spots in the metallic coating.

In describing the method of practicing the invention reference will be made to the accompanying drawings, wherein Fig. 1 shows the arrangement of apparatus used to inspect the inside surface of a tube or pipe.

Fig. 2 shows the arrangement of apparatus used to inspect the outside surface of a tube or rod.

Fig. 3 shows in more detail one arrangement for inspecting the inside surface of a conducting pipe or tube.

Fig. 4 shows an end view of the antenna of Fig. 3.

Fig. 5 shows the details of the detector or pick-up and its indicating device.

Fig. 6 shows more in detail one arrangement for inspecting the outside surface of a conducting pipe or rod.

Referring to Fig. 1, a source or generator of microwaves is designated by 2 and a receiver or detector by 3. These are slidably mounted inside of the tube 1 or pipe undergoing inspection. Both the source 2 and receiver 3 may be connected by cables 4 and 5 to the recorder or indicator 6. Alternatively the source 2 may be self-contained and it is then necessary to merely connect the receiver 3 to the indicator 6. Thus, in one way of practicing the invention the source 2 and receiver 3 are maintained a fixed distance apart and the assembly is moved longitudinally through the pipe being tested. A fixed distance between the source 2 and receiver 3 may be maintained by mounting both on a common supporting member such as 64 by means of supporting rods 69 and 70 one or both of which may be adjustable so as to permit obtaining the desired test interval. The indicator will then show the presence of surface cracks or flaws which influence the microwave transmission characteristic of the inside surface of the pipe and this may be correlated with the position of the assembly in a known manner to locate such flaws or surface irregularities.

In examining the outside surface of a pipe or rod the arrangement of Fig. 2 is used. Here 7 is the pipe or rod under test, 8 is a standard pipe of known surface characteristics, 9 is a source of microwaves here arranged in an annular fashion and 10 is a receiver also arranged in an annular manner. Source 9 may have connected to it an annular antenna such as 65, and receiver 10 may be connected to an annular antenna like 66, both of these antennas having the form of a ring connected respectively to the source or receiver through one or more appropriate short transmission lines 68 which may serve also to support the antennas. The desired test length may be maintained by mounting the source and receiver on supporting rods 71 and 72 adjustably fastened to a common support such as 67, thus maintaining the desired test distance. Alternatively the standard pipe 8 of known surface characteristics may extend simply from source 9 to receiver 10 and function also to keep the proper separation distance by being mechanically fastened to the source and receiver. The entire assembly may then be slipped over the tube 7 under test. The source and receiver are shown connected through cables 11 and 12 to the indicator 6, which indicates or records the presence of surface defects or flaws within the region localized between source 9 and receiver 10.

In the operation of Figs. 1 or 2 the power emitted by the source is kept constant and the power picked up by the receiver is recorded. Any unusual change in power picked up is indicative of an unusual condition in the pipe under test. Thus, if the pipe being tested is a conductor, then any decrease in power picked up is indicative of a change in surface characteristics of the pipe, a small decrease being interpreted as one or more small cracks or irregularities in the surface and a large decrease meaning the existence of a large or dangerous crack. Conversely, if the pipe being tested is an insulator, an increase in power picked up would indicate the presence of a conducting imperfection. Any anomalous attenuation may be used to indicate an anomalous condition of the pipe, the type of anomaly depending on the conditions of test.

The source 2 shown in Fig. 1 and 9 in Fig. 2 may take one of several forms. It may comprise a thermionic device known as a "Klystron" which is a known type of microwave generator, together with a microwave antenna of known form. For large diameter tubes 1 the entire assembly may be put inside the tube. For small diameter tubes, the Klystron may be left outside and a coaxial cable run to a suitable antenna or source inside the tube. Such an antenna is shown in Fig. 3. Here 26 is the tube being tested and 27 is the Klystron microwave generator. Energy is fed from the Klystron by means of coaxial cable 28 to the antenna made up of annular ring 29 and central disk 30. The ring and disk are shown in end view in Fig. 4.

The receiver 3, Fig. 1 and 10, Fig. 2, is also a known device and one possible form may be made up as shown in Fig. 5. While here shown as a unit to fit on the end of the pipe being tested, the same unit may alternatively be connected to an antenna in the pipe by means of a coaxial cable similar to that used on the source antenna. In Fig. 5, 33 indicates a circular cap which fits on the end of the pipe, 34 represents a probe extending through the diameter of this cap and 35 is a crystal rectifier mounted so that it is electrically in series with the probe. Tuning is accomplished by varying the position of the piston 38 in the cylindrical cavity 37. The cylinder 37 is separated by a small air gap from the housing 33 thus forming a condenser at 36 whose function is to by-pass the unrectified component of the current picked up by the receiver. Energy picked up by the receiver system 33, 34, 36 and 38 is rectified by rectifier 35 so that a unidirectional potential appears across the condenser 36. This is fed by means of wires 62 to a resistor 39 and current indicator 40, though either one of these are sufficient for recording purposes. Wires 41 lead to an amplifier or recording meter or any other suitable indicating device. In Fig. 3 the receiver 31, which in detail is similar to Fig. 5, is shown connected to an amplifier-recorder 32.

For making tests on the outside surface of electrically conducting pipes or tubes, an embodiment as shown in Fig. 6 may be used. Here 42 is a Klystron generator from which microwave energy is fed by means of coaxial cable 43 to the annular space between the pipe 46 under investigation and an outer pipe 45 of known characteristic. By fanning out the central conductor 63 of the coaxial cable to the coaxial conducting system 47, the energy will remain on the outside of the tube 46. Insulator 44 serves to center the conductor 63 inside the cable 43. At the other end of 46 the energy is fed by coaxial system 47 into a receiver or detector whose principle is similar to that of Fig. 5. A crystal rectifier 48 and by-pass condensers 49 result in the production of an easily measurable unidirectional current fed by means of wires 50 to recording meter 51. If further amplification is necessary the potential across resistor 52 may be led by leads 53 to an amplifier, recorder or control devices.

It is contemplated that the amplifying, recording or control instruments designated by numerals 6, 32, 40, 51, may be any device which may be used to give an indication of an abnormal degree of attenuation in the test specimen, or to record such an indication or any function thereof, or to control or bring into operation other devices such as marking devices to mark the flaws or cracks detected or to stop machinery. Such devices for the control of operations are known to those skilled in the art.

Our invention is not to be considered limited to the apparatus and methods shown for illustration only, but contemplates the use of microwaves for the surface testing of any tubular material which may be made the walls of a microwave guide or cavity resonator.

What we claim as our invention is:

1. A method of inspecting the outside surface of a cylindrical body comprising surrounding it with a larger substantially concentric hollow cylinder, generating microwave energy and launching it in the space between the cylindrical surfaces, transmitting microwave energy via a selected portion of said cylindrical surfaces, receiving microwave energy from the space between the cylindrical surfaces, measuring a characteristic value of the received energy and varying the portion of the cylindrical surfaces selected for transmission.

2. Apparatus for inspecting the outside surface of a cylindrical body comprising a larger hollow cylinder, means for maintaining the body inside said hollow cylinder, a microwave generator, means for connecting said generator in energy-transmitting relationship to the space between said cylinders, a microwave receiver, means for connecting said receiver in energy-receiving relationship to the space between said cylinders, means for measuring a characteristic value of the received energy and means for moving the body with respect to said energy-transmitting and said energy-receiving connecting means.

MORRIS MUSKAT.
NORMAN D. COGGESHALL.

REFERENCES CITED

The following references are of record in the file of this patent:

UNITED STATES PATENTS

| Number | Name | Date |
|---|---|---|
| 1,895,643 | Putnam | Jan. 31, 1933 |
| 2,094,234 | Drain, Jr. | Sept. 28, 1937 |
| 2,150,922 | Hay | Mar. 21, 1939 |
| 2,197,123 | King | Apr. 16, 1940 |
| 2,231,602 | Southworth | Feb. 11, 1941 |

OTHER REFERENCES

General Electric Review, Sept. 1941, pages 507–510.